(12) United States Patent
Kim et al.

(10) Patent No.: US 10,819,897 B2
(45) Date of Patent: Oct. 27, 2020

(54) ELECTRONIC DEVICE AND METHOD FOR CONTROLLING AUTOFOCUS OF CAMERA

(71) Applicant: Samsung Electronics Co., Ltd., Gyeonggi-do (KR)

(72) Inventors: Eunho Kim, Gyeonggi-do (KR); Jaehyoung Park, Gyeonggi-do (KR); Jonghoon Won, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 93 days.

(21) Appl. No.: 16/197,901

(22) Filed: Nov. 21, 2018

(65) Prior Publication Data
US 2019/0222742 A1 Jul. 18, 2019

(30) Foreign Application Priority Data

Jan. 16, 2018 (KR) ........................ 10-2018-0005722

(51) Int. Cl.
*H04N 5/232* (2006.01)
*G03B 13/00* (2006.01)
(Continued)

(52) U.S. Cl.
CPC .......... *H04N 5/23212* (2013.01); *G06T 7/80* (2017.01); *H04N 5/23293* (2013.01);
(Continued)

(58) Field of Classification Search
CPC .......... H04N 5/23212; H04N 5/23293; H04N 5/232121; H04N 5/232122;
(Continued)

(56) References Cited

U.S. PATENT DOCUMENTS 8,721,093 B2 5/2014 Hsiung
9,721,093 B2 8/2017 Poornachandran et al.
(Continued)

FOREIGN PATENT DOCUMENTS

JP 5013705 6/2012
KR 2014/0086411 7/2014

OTHER PUBLICATIONS

International Search Report dated Apr. 8, 2019 issued in counterpart application No. PCT/KR2019/000104, 3 pages.

*Primary Examiner* — Kelly L Jerabek
(74) *Attorney, Agent, or Firm* — The Farrell Law Firm, P.C.

(57) ABSTRACT

An electronic device includes a display; a camera module configured to move an image sensor, wherein the camera module includes a lens unit comprising at least one lens disposed on the image sensor and a lens driving unit configured to move the at least one lens; and a processor configured to display a first image comprising an external object obtained with a first view angle by using the camera module through the display, move a location of the at least one lens by using the lens driving unit so that a view angle of the external object changes from the first view angle to a second view angle, obtain a second image comprising the external object with the second view angle by using the camera module, select a part of the second image so that a view angle of the second image becomes practically identical to the first view angle, and display a part of the selected second image by using the display.

13 Claims, 21 Drawing Sheets

(51) Int. Cl.
*G06T 7/80* (2017.01)
*H04N 5/262* (2006.01)

(52) U.S. Cl.
CPC . *H04N 5/232122* (2018.08); *H04N 5/232123* (2018.08); *H04N 5/23287* (2013.01); *H04N 5/2628* (2013.01)

(58) Field of Classification Search
CPC ....... H04N 5/232123; H04N 5/232125; H04N 5/232127; H04N 5/232133; H04N 5/23216
See application file for complete search history.

(56) References Cited

U.S. PATENT DOCUMENTS

| | | | | |
|---|---|---|---|---|
| 10,516,820 | B2* | 12/2019 | Yoon | H04N 5/23212 |
| 2007/0116382 | A1 | 5/2007 | Gotanda | |
| 2014/0184879 | A1 | 7/2014 | Kim et al. | |
| 2014/0333790 | A1* | 11/2014 | Wakazono | H04N 5/23245 348/222.1 |
| 2015/0138429 | A1* | 5/2015 | Ogura | H04N 5/23232 348/349 |
| 2015/0138430 | A1* | 5/2015 | Ogura | H04N 5/23212 348/349 |
| 2015/0146011 | A1* | 5/2015 | Tsubusaki | G06K 9/00228 348/169 |
| 2015/0281552 | A1* | 10/2015 | Ogura | H04N 5/23212 348/349 |
| 2015/0281553 | A1* | 10/2015 | Ogura | H04N 5/23212 348/348 |
| 2015/0281554 | A1* | 10/2015 | Ogura | H04N 5/23212 348/333.11 |
| 2015/0296130 | A1 | 10/2015 | Terauchi | |
| 2017/0214856 | A1 | 7/2017 | Liao et al. | |
| 2017/0295315 | A1 | 10/2017 | Chang et al. | |
| 2017/0374279 | A1 | 12/2017 | Holz | |
| 2019/0004282 | A1* | 1/2019 | Park | G06T 7/248 |
| 2019/0149739 | A1* | 5/2019 | Sugita | H04N 5/23209 348/240.99 |

* cited by examiner

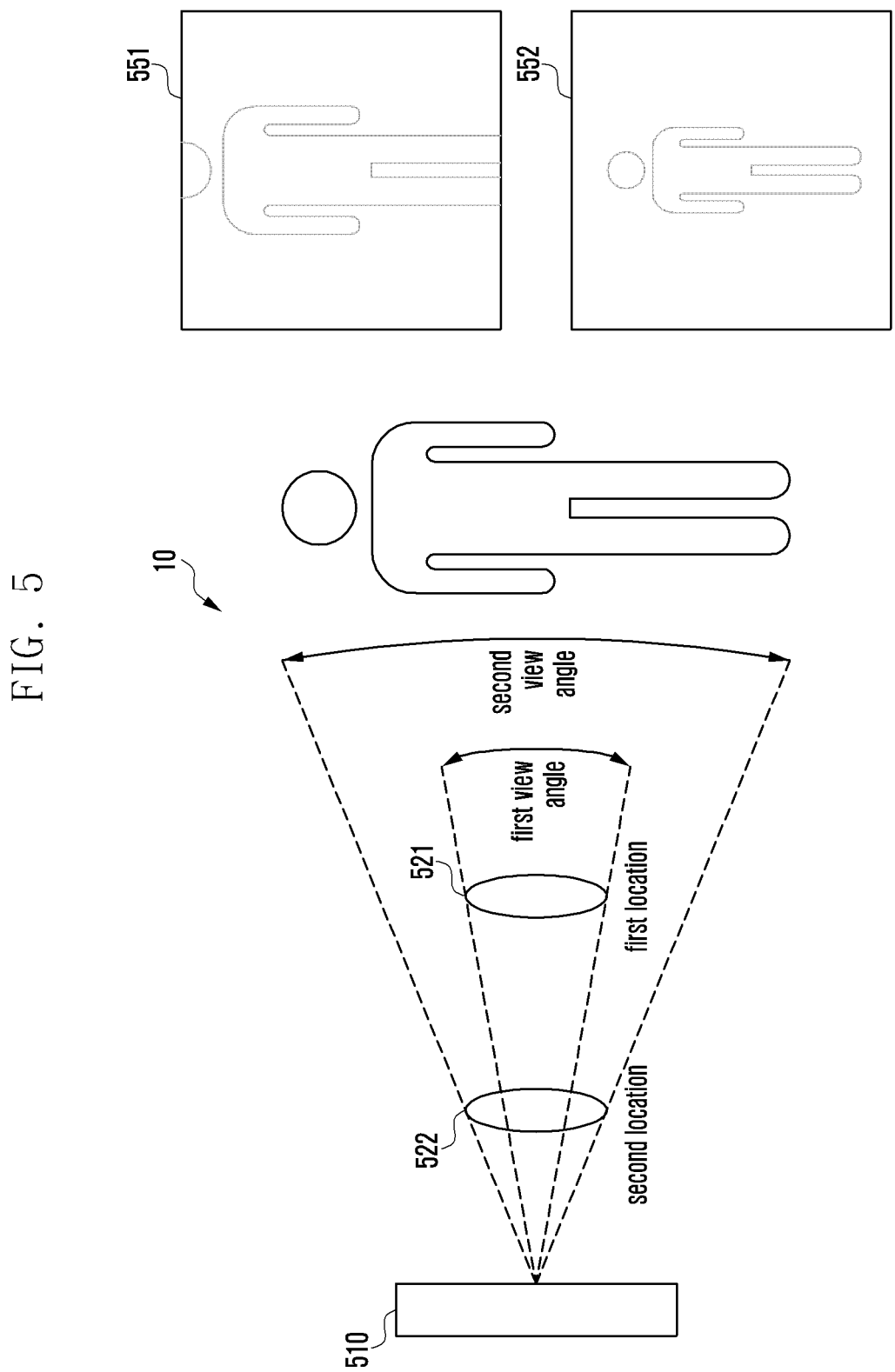

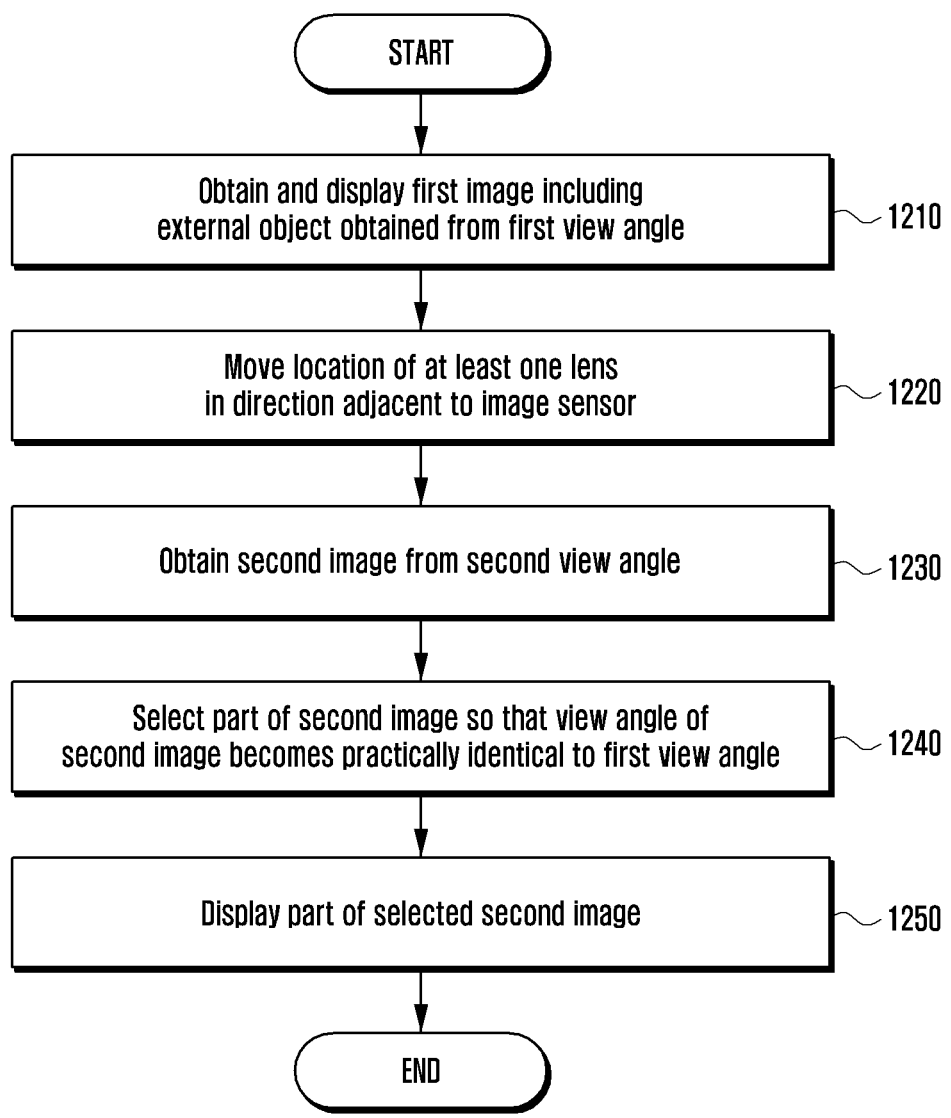

ELECTRONIC DEVICE AND METHOD FOR CONTROLLING AUTOFOCUS OF CAMERA

CROSS-REFERENCE TO RELATED APPLICATION(S)

This application is based on and claims priority under 35 U.S.C. § 119 to Korean Patent Application No. 10-2018-0005722, filed on Jan. 16, 2018, in the Korean Intellectual Property Office, the disclosure of which is incorporated by reference herein in its entirety.

BACKGROUND

1. Field

The present disclosure relates to an electronic device and, particularly, to an electronic device equipped with a camera having an autofocus function, and a method for controlling the autofocus function of the camera in the electronic device.

2. Description of Related Art

Camera modules can generate an image corresponding to an external object by detecting an incident light with unit pixels of an image sensor. Recently, portable electronic devices such as smartphones and tablet PCs are generally equipped with a camera module, and various functions can be performed by using the camera module of the electronic devices.

An autofocus (AF) function is one of the functions of the camera module and focuses on an external object automatically. The electronic device can be equipped with a camera module having an AF function. The AF function can be provided based on various methods such as a contrast AF method, a phase difference AF method, or a depth from defocus (DFD) method.

Electronic devices can perform an AF function and simultaneously display an image obtained from an image sensor through a display. In the case of an AF method, a location of a lens can be moved automatically along an optic axis, and a view angle of a displayed image may vary according to a change of a focus location and a change of optical characteristics of the lens.

In a procedure in which the camera module moves a lens for focusing, if a view angle of an image increases and decreases repeatedly, a screen wobbling phenomenon can arise in the displayed image.

It may be advantageous to provide an electronic device and procedure for minimizing a screen wobbling phenomenon.

SUMMARY

The present disclosure has been made to address the above-mentioned problems and disadvantages, and to provide at least the advantages described below.

In accordance with an aspect of the present disclosure, an electronic device is provided that includes a display; a camera module configured to move an image sensor, wherein the camera module includes a lens unit comprising at least one lens disposed on the image sensor and a lens driving unit configured to move the at least one lens; and a processor configured to display a first image including an external object obtained with a first view angle by using the camera module through the display, move a location of the at least one lens by using the lens driving unit so that a second view angle of the external object changes from the first view angle to a third view angle, obtain a second image including the external object with the third view angle by using the camera module, select a part of the second image so that a fourth view angle of the second image becomes practically identical to the first view angle, and display a part of the selected second image by using the display.

In accordance with another aspect of the present disclosure, an electronic device is provided that includes a camera module including a lens unit and a lens driving unit configured to move the lens unit in order to change a camera focus; a memory; and a processor configured to obtain a first image corresponding to a first location of the lens unit by using the camera module, display the first image by using the display, move the lens unit according to a predetermined movement distance by using the lens driving unit, obtain a second image corresponding to a second location of the lens unit by using the camera module, display at least a part of the second image corresponding to the first image by using the display, determine a focus location of the lens unit at least based on a difference between the first image and the second image, and move the lens unit to the focus location by using the lens driving unit.

In accordance with another aspect of the present disclosure, a method for controlling an AF function in an electronic device is provided that includes obtaining and displaying a first image comprising an external object obtained with a first view angle, moving a location of at least one lens so that a second view angle of the external object changes from the first view angle to a third view angle, obtaining a second image including the external object obtained with the third view angle in a state that the location of at least one lens is moved, selecting a part of the second image so that a fourth view angle of the second image becomes practically identical to the first view angle, and displaying a part of the selected second image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates an example of a view angle of an image obtained from a lens location, according to an embodiment;

FIG. 12 is a flowchart illustrating a method of controlling a camera AF function in an electronic device, according to an embodiment;

DETAILED DESCRIPTION

Figure 1:
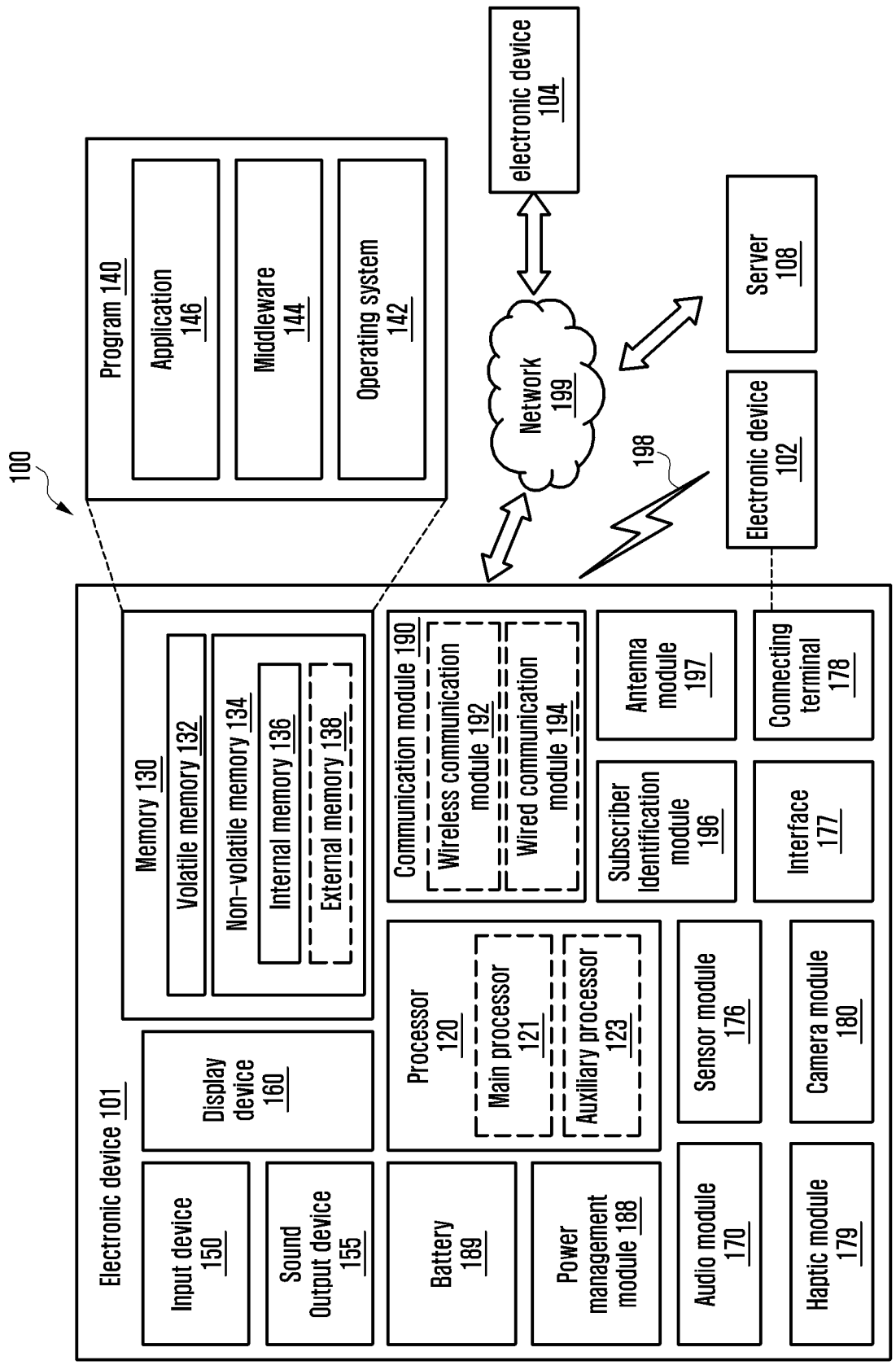
FIG. 1 is a block diagram illustrating an electronic device in a network environment, according to an embodiment.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
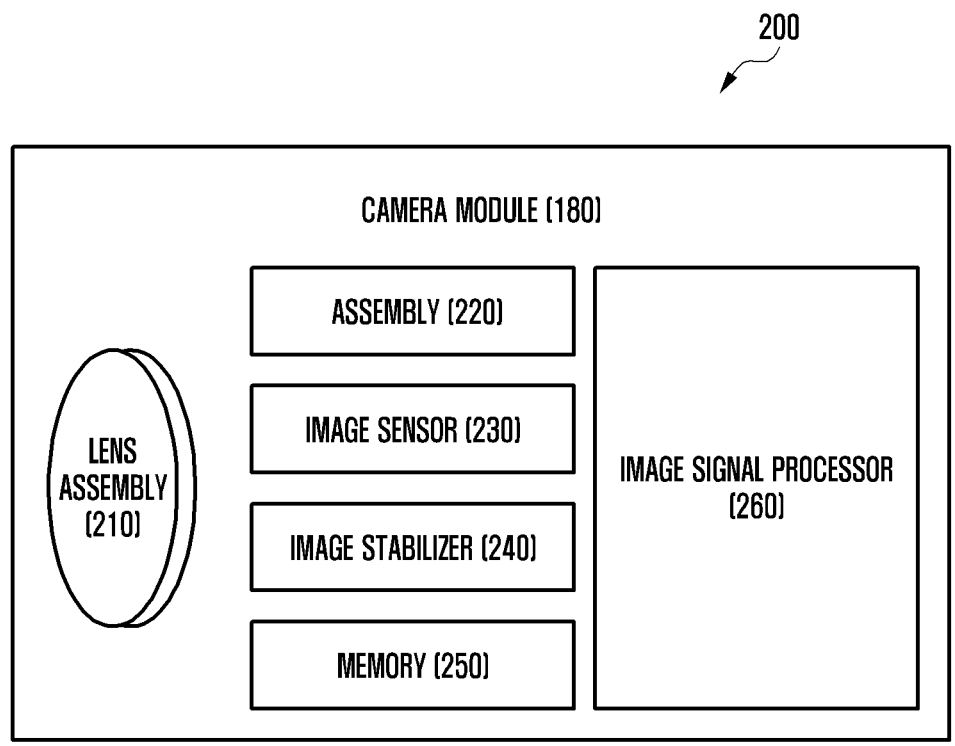
FIG. 2 is a block diagram illustrating a camera module, according to an embodiment.

FIG. 2 is a block diagram 200 illustrating the camera module 180, according to an embodiment.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. The image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor disposed inside or outside the camera module 180. The image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
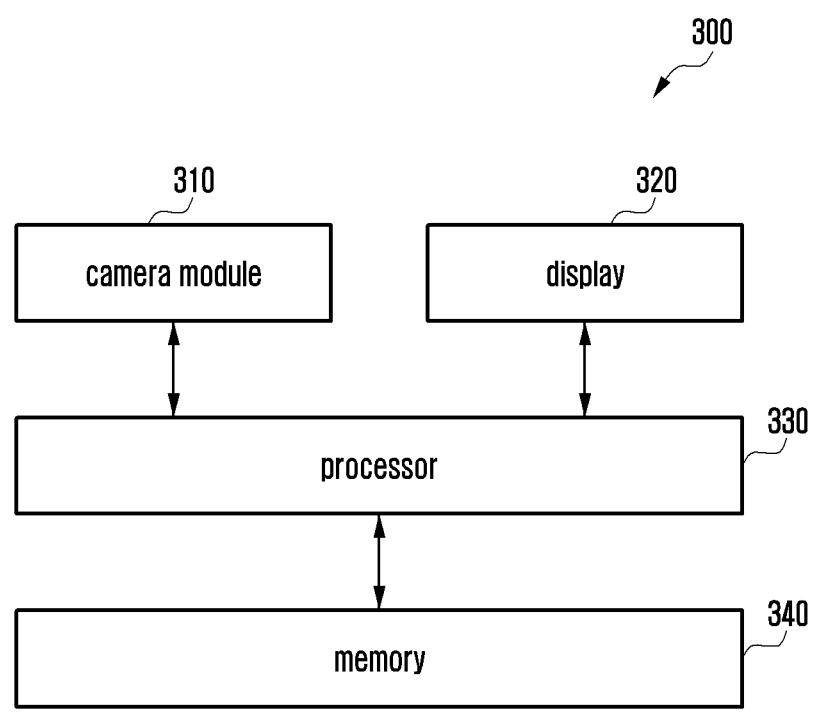
FIG. 3 is a block diagram illustrating an electronic device, according to an embodiment.

FIG. 3 is a block diagram illustrating an electronic device, according to an embodiment.

Referring to FIG. 3, the electronic device 300 includes a camera module 310, a display 320, a processor 330, and a memory 340; and various embodiments of the present disclosure can be implemented even if at least one part of the illustrated configuration is omitted or substituted according to a specific embodiment form. The electronic device 300 may further include at least one part of the configuration and/or function of the electronic device 101 of FIG. 1.

The display 320 is a component for displaying an image, and it may include a liquid crystal display (LCD), a light-emitting diode (LED) display, and an organic LED (OLED) display. The display 320 may include at least one part of the configuration and/or function of the display device 160 of FIG. 1. The display 320 can display an image based on an image signal received from the processor 330, and display an image (e.g., the preview image) obtained from an image sensor 230 of the camera module 310 while the camera module 310 is operating.

The memory 340 may include a volatile memory 132 and/or a non-volatile memory 134, and it can be electrically connected to the processor 330. The memory 340 can store various instructions which can be executed by the processor 330. Such an instruction may include control commands for a calculation and a logical operation recognizable by a control circuit, data movement, and input/output. Further, the memory 340 may include at least one part of the program 140 of FIG. 1.

The camera module 310 is used for obtaining an image of an external object, and it may include at least one part of the configuration and/or function of the camera module 180 of FIG. 1. The camera module 310 may include a lens unit, a lens driving unit, an image sensor, a camera processor, and a memory, and the configuration and operation of the camera module 310 will be described in detail with reference to FIG. 4.

The camera module 310 can adjust a focus of an image by moving at least one lens included in the lens unit 210 along an optic axis while capturing the image. The lens unit may include a plurality of lenses and a lens barrel accommodating the plurality of lenses, and the lens unit can move the whole location of the plurality of lenses along the lens barrel or at least one lens independently while performing an. Hereinafter, the movement of the lens unit or the movement of at least one lens may be used with the same meaning, and it may include a case in which the lens barrel moves or a case in which at least one lens moves independently in the lens barrel.

The method used by the camera module 310 may include a contrast AF method, phase difference AF method, or DFD method.

According to the contrast AF method, the camera module 310 can obtain a contrast for an image signal generated by an image sensor while changing a location of a lens (e.g., lens unit), and it can set a focus by adjusting the lens location where a contrast value of the lens reached a peak. According to the phase difference AF method, the camera module 310 may include a sensing device separate from the image sensor or detect a phase difference of light by using pixels of at least two image sensors, and it may detect a focus location by using a phase difference of light applied to the sensing device or a phase difference obtained from the at least two image pixels. According to the DFD method, the camera module 310 can obtain two images from different lens locations and identify a focus location by identifying a point spread function (PSF) corresponding to defocus changes of the two images (i.e., a DFD calculation). An example of the camera module 310 controlling focusing according to the DFD method is described; however, various AF methods of calculating a movement in advance and identifying a focus location by using a plurality of images (e.g., 2 images) obtained from differently calculated lens locations can be applied to various embodiments of the present disclosure. Operations of the camera module 310 for determining a focus function according to the DFD method will be described in more detail with reference to FIG. 4.

The processor 330 is a component for calculating or data processing related to control and/or communication of each component of the electronic device 300, and may include at least one of the configurations and/or functions of the processor 120 of FIG. 1. The processor 330 can be electrically connected to each component of the electronic device 300 (e.g., camera module 310, display 320, and memory 340). The processor 330 is not limited to the calculation and data processing functions executable in the electronic device 300 and, hereinafter, various embodiments for controlling an adjustment to an AF function of the camera module 310 and displaying images obtained from the camera module 310 through the display 320 in a process of adjusting the AF function will be described. The following operations of the processor 330 can be performed by loading instructions stored in the memory 340 as described above.

The processor 330 can control adjusting an AF function by changing at least one lens location predetermined by the lens unit of the camera module 310. The AF adjustment can be triggered if the camera module 310 is initially turned on for obtaining an image, for example, or if a movement of an external object (or subject) is detected in an image capturing process (e.g., video).

The processor 330 can obtain a first image including an external object with a first view angle by using the camera module 310, and it can display at least one part of the obtained first image through the display 320. In other words, the first view angle may mean a view angle of the obtained first image shown in the display 320. Here, the first view angle is a view angle of an image obtained in case that at least one lens of the lens unit is located at a first location, and the first location may be a location of at least one lens in the case that the AF adjustment is triggered. According to an embodiment, the processor 330 can display the first image in the display 320 by converting an image resolution (e.g., resolution of image sensor) according to the resolution of the display 320.

The processor 330 can move a location of at least one lens (or lens unit) by using the lens driving unit, and it can obtain a second image including the external object with a second view angle by using the camera module 310. Here, the second view angle may be a view angle of an image obtained when the at least one lens moves to the second location.

The second location may be located closer than the first location to the image sensor based on an optic axis of the image sensor and the lens unit. In this case, the second view angle may be greater than the first view angle. According to another embodiment, the second location may be located farther away from the image sensor than the first location based on the optic axis of the images sensor and the lens unit. In this case, the second view angle may be smaller than the first view angle.

The processor 330 can select a part of the second image so that the view angle of the second image becomes practically identical to the first view angle. According to one embodiment, the processor 330 can select a part of the second image to be displayed by cropping the second image. According to another embodiment, the processor 330 can read out only the data of a partial area practically identical to the first view angle when reading out the second image obtained from the image sensor. As described above, the second view angle of the second image may be greater than the first view angle of the first image, and the processor 330 can crop a part of the second image so that the second image has a view angle practically identical to the first view angle of the first image by removing at least one part of the second image in the vicinity of the edges. Accordingly, the view angle may not change although the first image and the second image are continuously displayed. The processor 330 can determine a resolution of the selected part of the second image based on the resolution of the display 320. The processor 330 can determine a focus location of at least one lens based on a difference between the first image and the second image. Here, the focus location may be a location of at least one lens where the current external object being captured is in focus. The processor 330 can input the first image and the second image into a PSF and determine a focus location according to the result of the PSF. The method for determining a focus location by using the PSF will be described in more detail with reference to FIGS. 6A and 6B.

The processor 330 can move at least one lens to the determined focus location, obtain an image of an external object in a state in which the lens is in focus, and display the image on the display 320 and/or store the image in the memory 340. Subsequently, the processor 330 can repeat the above procedure if focusing the lens must be reset because a change of the external object is detected.

At least one part of the above operations of the processor 330 can be performed by a camera processor of the camera module 310. In this case, the processor 330 can transmit a control signal to the camera processor, and the camera processor 330 can control the lens driving unit according to the received control signal and generate and/or compensate an image signal.

Figure 4:
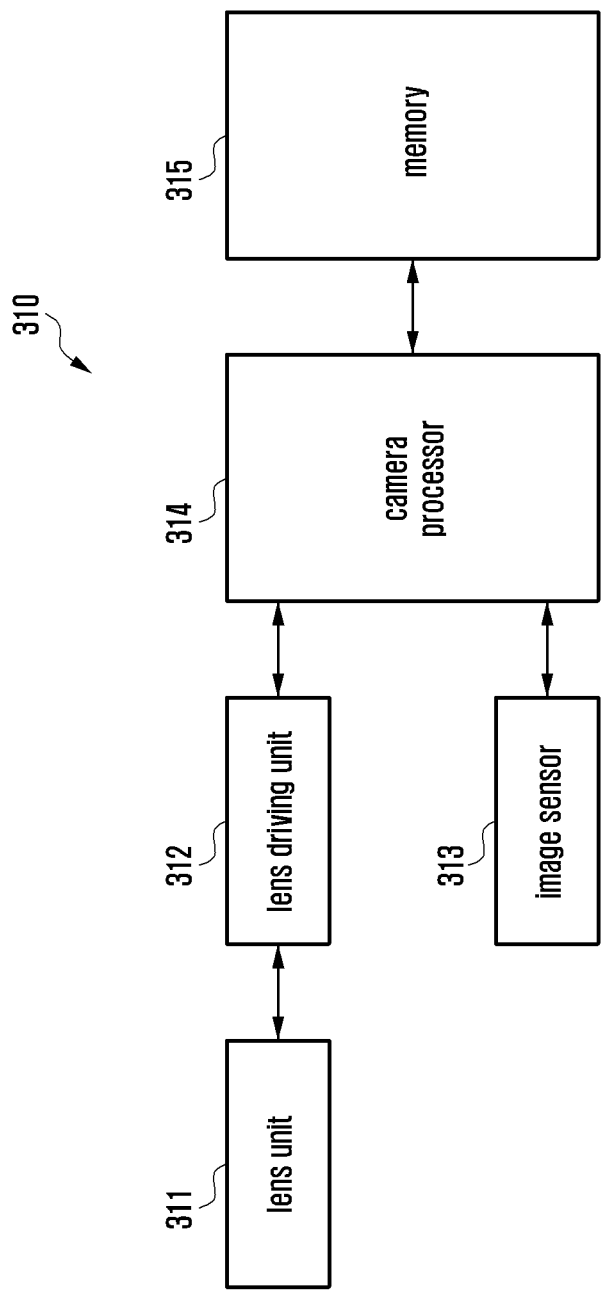
FIG. 4 is a block diagram illustrating a camera module, according to an embodiment.

FIG. 4 is a block diagram illustrating a camera module, according to an embodiment.

As shown in the drawing, the camera module 310 includes a lens unit 311, a lens driving unit 312, an image sensor 313, a camera processor 314, and a memory 315. Various embodiments of the present disclosure can be implemented even if at least one part of the illustrated configuration is omitted or substituted. The camera module 310 may include the camera module 310 of FIG. 3, and it may further include at least one part of the configuration and/or function of the camera module 180 of FIG. 2.

The lens unit 311 may include a plurality of lenses. The plurality of lenses may be fixed in a barrel and can move in an optic axis direction. At least one lens among the plurality of lenses can move in a direction practically parallel to the optic axis according to a control of the lens driving unit 312 when adjusting an AF function.

The image sensor 313 can detect a light passing through the lens unit 311 and output a corresponding electric signal. The image sensor 313 may include a plurality of photodiodes, and an electric signal output by each photodiode can form an image signal by configuring each photodiode in a unit pixel. The image sensor 313 may be configured with a charge coupled device (CCD) sensor or a complementary metal oxide semiconductor (CMOS) sensor; however, the present disclosure is not limited to these examples.

The camera processor 314 can generate an image signal based on an electric signal output by the image sensor 313. Further, the camera processor 314 can adjust a location of at least one lens of the lens unit 311 when adjusting an AF function by controlling the lens driving unit 312 according to a control signal of the processor (e.g., processor 330 of FIG. 3). Further, at least one part of the operations of the camera processor 314 can be performed based on a control signal of the processor 330 in the electronic device.

The lens driving unit 312 can move at least one lens of the lens unit 311 based on a control signal of the camera processor 314. The at least one lens may move in a direction (hereinafter, a first direction) towards the image sensor 313 or in a direction (hereinafter, a second direction) away from the image sensor 313 according to the control of the lens driving unit 312.

The lens driving unit 312 can move the at least one lens in the first or second direction by as much as a movement distance corresponding to the control signal received from the camera processor 314. According to an embodiment, the lens driving unit 312 can move the lens for a focus adjustment along the optic axis or by designating a unit interval. The designated unit interval may be determined by dividing the total interval movable by the lens into 1024 (=$2^{10}$) sections or 512 (=$2^9$) sections. At least one part of the unit intervals may have an identical optical distance and the other unit intervals may have different optical distances. For example, the lens driving unit 312 can move the location of the at least one lens by as much as a first interval in a partial section of the total section movable by the lens and by as much as a second interval in other partial sections. The first interval and the second interval may be determined so that a defocus size change of an image projected on the image sensor 313 according to a lens movement becomes constant or varies within a predetermined deviation.

The memory 315 or 340 can pre-store PSFs predetermined corresponding to specific distances. Each location of the lens unit 311 may include all the locations movable by a force of the lens driving unit 312 and a movement margin section. For example, the point spread function can be modeled in various forms and methods so that each location of each of the sections movable by the lens unit 311 is displaced as much as a specific distance between the image sensor 313 and the lens unit 311 and corresponds to a defocus size of an image obtained from an unsaturated point light source. Alternatively, the point spread function can be modeled in various forms and methods so that each location movable to by the lens unit 311 corresponds to a defocus size of a point light source displaced by as much as a specific distance by using a formula based on designed data of the lens unit.

The size (or interval) of the point spread function can be calculated differently according to at least one of each location of a lens or a distance to a subject. For example, the size of the point spread function becomes smallest when the lens is located at a focus location, and it increases as the lens is displaced from the focus location. In another example, the size of the PSF identified from two captured images in a state that the locations of the lens unit 311 are identical may become smaller as the distance to the subject becomes closer to the focus location of the lens unit 311, and it may become greater as the distance to the subject becomes farther from the focus location of the lens unit 311.

The memory 315 can store movement distances corresponding to a distance with respect to a specific subject and each relative location of the lens unit 311. The movement distance of the lens unit can be determined so that a defocus change having a specific size is generated according to a unit movement of the lens unit 311 and a location change of the specific subject. In this case, the movement distance of the lens may vary according to each location of the subject, and a conversion variable can be stored in a lookup table form.

The camera processor 314 can extract an area of interest (or subject) from an image projected on the image sensor 313 and identify a defocus size of the extracted area of interest. The camera processor 314 can identify the defocus size of the area of interest by tracing the area of interest. In this process, the camera processor 314 can adjust the focus location of the lens unit 311 by applying a control signal to the lens driving unit 312.

The camera processor 314 can obtain two images for a subject projected on the image sensor 313 at different lens locations. For example, the camera processor 314 can obtain a first image of a subject projected on the image sensor 313 in a state of locating at least one lens at a first location, and it can obtain a second image of the subject projected on the image sensor 313 in a state of locating the at least one lens at a second location by moving by as much as a predetermined movement distance.

The camera processor 314 can determine a focus location of the lens unit 311 at least based on a difference between the first image and the second image. The camera processor 314 can calculate a defocus amount of an area of interest by performing a DFD arithmetic operation based on a specific movement distance of a lens (or distance between a first location and a second location) through specific PSFs and a difference between the obtained first image and second image. Because the defocus location corresponds to a distance from the current location of the lens unit 311 to the focus location, the camera processor 314 can determine a movement distance from the calculated defocus location to the focus location. The camera processor 314 can obtain an image in focus by moving at least one lens to the determined focus location.

FIG. 5 illustrates an example of a view angle of an image obtained from a lens location, according to an embodiment.

Referring to FIG. 5, at least one lens of the lens unit 311 of the camera module 310 can move along an optic axis in a normal direction perpendicular to the upper surface of the image sensor 510. As shown in FIG. 5, the image sensor can obtain an image 551 with a first view angle from an external object 10 if the lens is located at a first location 521, and the image sensor can obtain an image 552 with a second view angle if the lens is located at a second location 522.

Here, because the second location 522 is closer to the image sensor 510 than the first location 521, the second view angle may be greater than the first view angle. Accordingly, the second image 552 having the second view angle may include a wider area of the external object 10 than the first image 551 having the first view angle.

FIGS. 6A to 6D illustrate a procedure of controlling a focus corresponding to a lens location when controlling an AF function in a DFD, according to an embodiment.

Figure 6A:
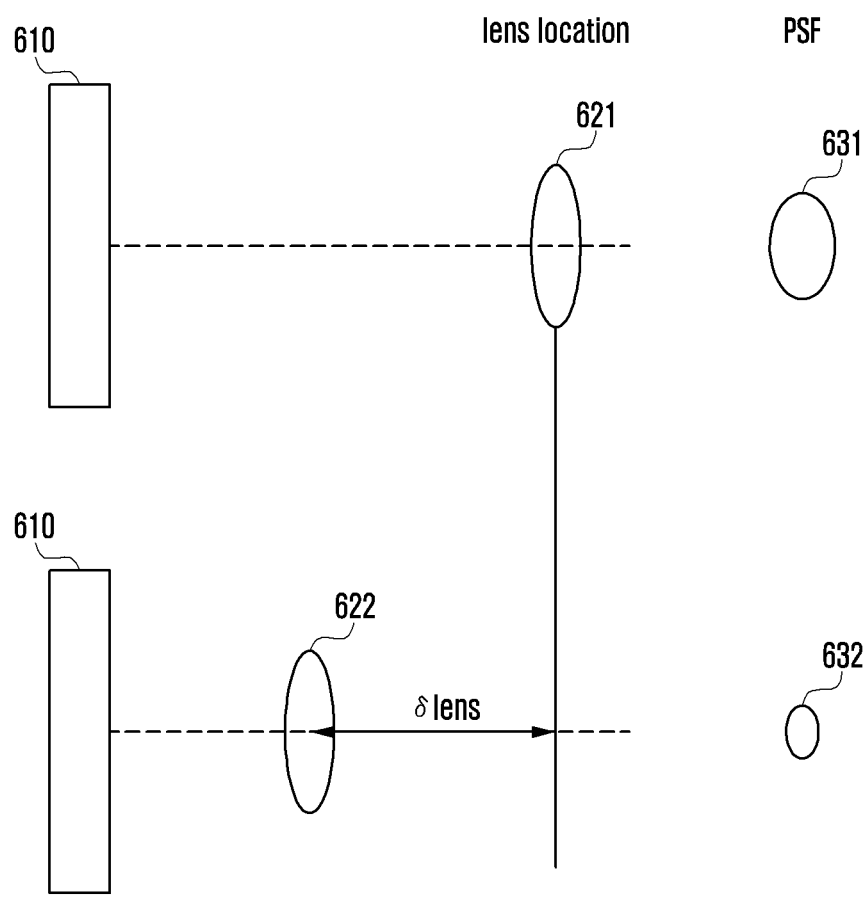
FIGS. 6A to 6D illustrate a procedure of controlling a focus corresponding to a lens location when controlling an AF function in a DFD method, according to an embodiment.
Figure 6B:
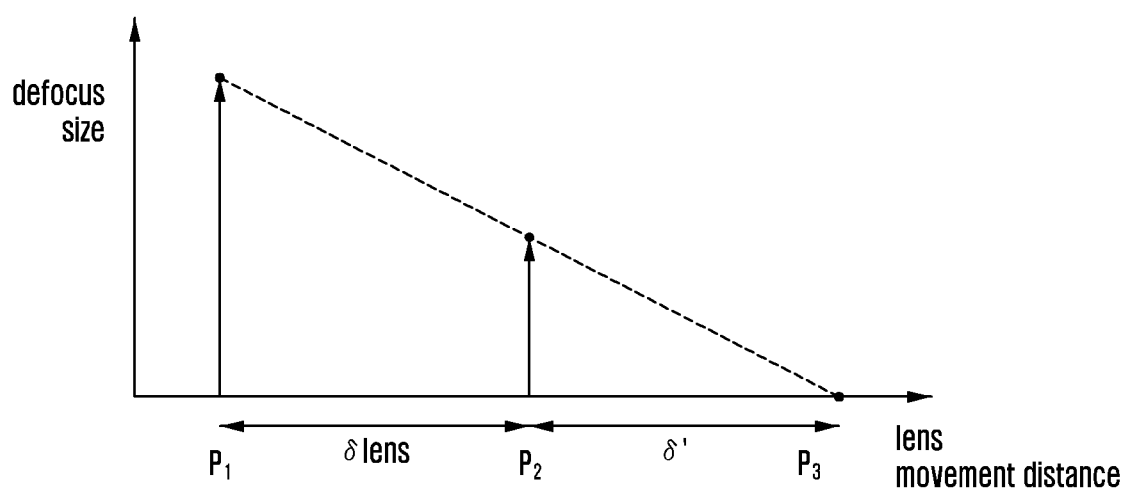
Figure 6C:
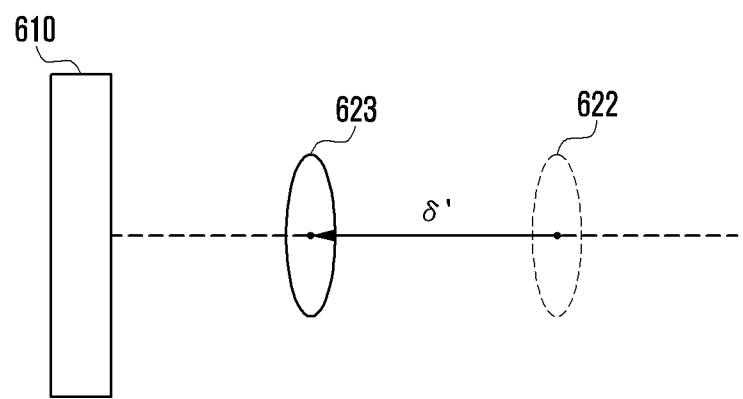

Referring to FIG. 6A, the processor (e.g., processor 330 of FIG. 3 or camera processor 314 of FIG. 4) can obtain a first image by using an image sensor 610 in a state that at least one lens of the lens unit 311 is located at a first location 621, and the procedure of obtaining an image can be performed when an AF adjustment is triggered (e.g., when a camera module is turned on or when a change of an external object is detected and a focus adjustment is required). Because the external object is not in focus in a state that the lens is located at the first location 621, the first image may be a defocused image which is not in focus.

The processor can move at least one lens along a predetermined movement distance $\delta_{lens}$ by using the lens driving unit 312. As described above, the movement distance of the lens can be divided into unit intervals, and a direction and the movement distance for moving the lens may be pre-stored in the memory 315 in order to obtain a second image after obtaining the first image.

The processor can obtain the second image in a state in which the lens is located at a second location 622 after moving by as much as the predetermined movement distance.

The processor can perform a DFD arithmetic operation by using a PSF based on a difference between the first image or the second image and the predetermined movement distance (e.g., $\delta_{lens}$). According to the result of the DFD arithmetic operation, defocus sizes of the first image and the second image can be calculated and, according to FIGS. 6A and 6B, a defocus size 631 (corresponding to P1) of the first image may be greater than a defocus size 632 (corresponding to P2) of the second image.

In addition, the defocus size of the first image may be smaller than the defocus size of the second image according to a distance between an external object and an electronic device. Here, the defocus size may mean a degree of image blur, a degree of low frequency change, or a value digitized from an area where a filtering coefficient is not 0. An image having a defocus size 0 may be an image having an on-focus state, and an image having a greater defocus size may be an image that is not in focus.

In the DFD arithmetic operation, because the focus location may have a defocus size 0 and the defocus size and the lens location may have a practically a linear form, the processor can calculate a movement distance $\delta'$ of a lens based on the defocus size 631 of the first image and the defocus size 632 of the second image in order to adjust the defocus size to 0.

The processor can adjust a focus state of the camera module by moving the lens to a third location 623 according to the calculated movement distance. Accordingly, the image sensor 610 can obtain a focused image.

Figure 6D:
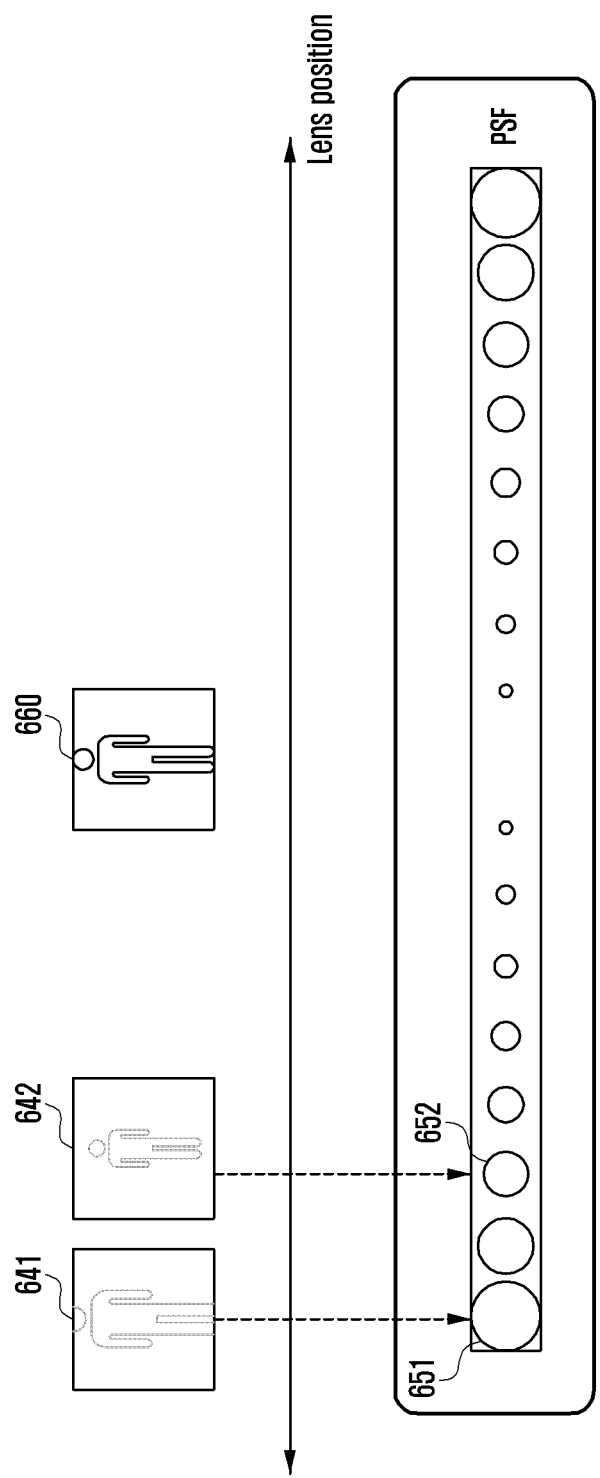

Referring to FIG. 6D, the processor can obtain a first image 641 having a defocus state in a state in which at least one lens of the lens unit is located at the first location, and it can obtain a second image 642 having a defocus state by moving the at least one lens to the second location. As shown in FIG. 6D, according to the result of performing the DFD arithmetic operation by inputting the first image 641 and the second image 642, a defocus amount 652 of the second image can be identified as smaller than a defocus amount 651 of the first image. Accordingly, a lens location having a defocus amount 0 can be identified, and an on-focus image 660 can be obtained by moving the lens to the identified location.

Figure 7A:
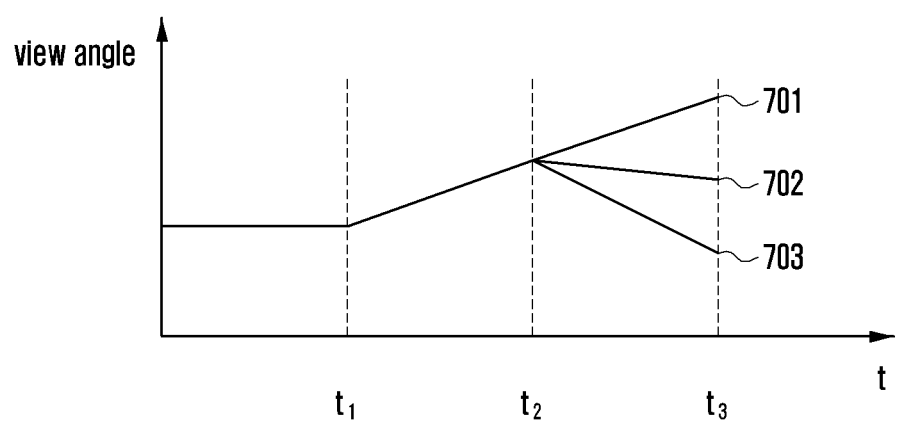
FIGS. 7A and 7B illustrate a comparison example of view angles of images displayed when controlling an AF function, according to an embodiment.
Figure 7B:
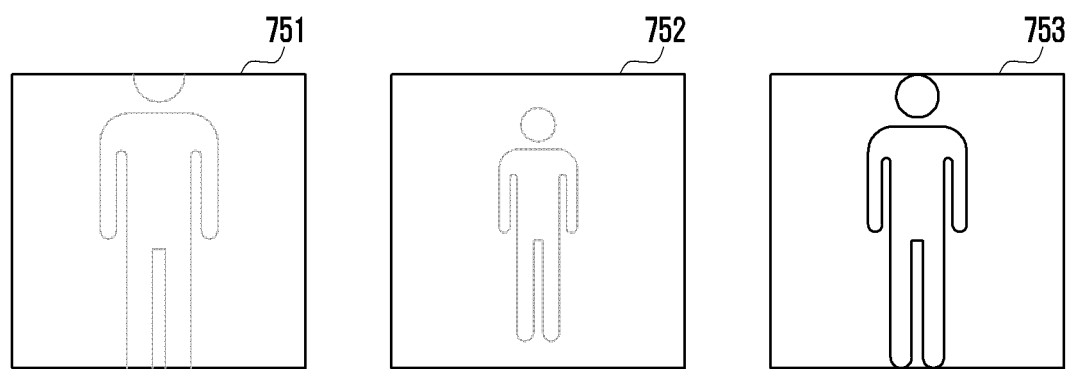

FIGS. 7A and 7B illustrate a comparison example of view angles of images displayed when controlling an AF, according to an embodiment.

As shown in FIGS. 7A-7B, the processor can obtain a first image 751 at $t_1$ with a first view angle in a state in which a lens is located at a first location. At $t_2$, the processor can move the lens to a second location by moving the lens as much as a predetermined movement distance (e.g., $\delta_{lens}$) in a direction towards an image sensor. Because the second location is located closer to the image sensor than the first location, a view angle of a second image 752 obtained at the second location may be greater than the view angle of the first image 751.

After obtaining the second image 752 at $t_2$, the processor can perform a DFD arithmetic operation by using a PSF based on a difference between the first image 751 or the second image 752 and the predetermined movement distance (e.g., $\delta_{lens}$), and a focus location of the lens can be determined accordingly. At $t_3$, the processor can obtain a focused image 753 by moving the lens to the focus location. For example, the lens can be moved to a location 701 close to the image sensor in the case of the location 701 where a view angle of the focus location becomes greater, the lens can be moved to a location 702 far from the image sensor in the case of the location 702 where the view angle of the focus location becomes smaller, and the lens can be moved to a location 703 farther from the image sensor in the case of the location 703 where the view angle of the focus location becomes even smaller.

FIG. 7B illustrate images obtained at $t_1$ to $t_3$. As shown by reference number 702 of FIG. 7A, the view angle of the second image 752 may be greater than the view angle of the first image 751, and the view angle of the focused image 753 may be smaller than the view angle of the second image 752. In this case, in a state of displaying the first image 751, the second image 752, and the focused image 753 continuously through a display 330, a screen wobbling phenomenon can arise because a screen including an external object shrinks and expands again.

Figure 8A:
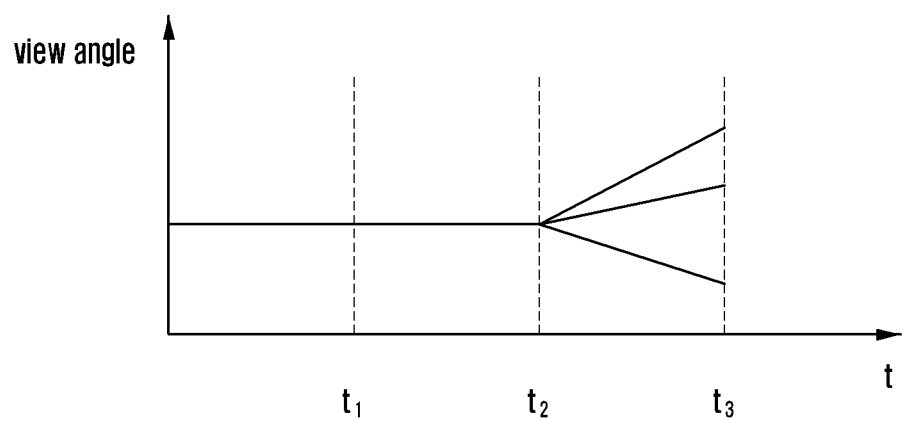
FIGS. 8A and 8B illustrate an example of a view angle of an image when controlling an AF function, according to an embodiment.
Figure 8B:
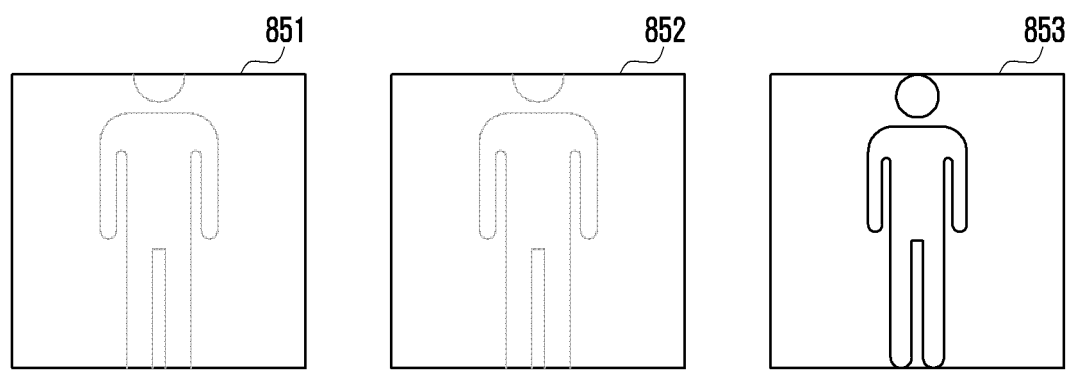

FIGS. 8A and 8B illustrate an example of a view angle of an image when controlling an AF, according to an embodiment.

When comparing FIGS. 8A and 8B with FIGS. 7A and 7B, the method of determining a lens location and a focus location may be identical; however, a view angle of an image (e.g., a second image) displayed through a display may be different.

As shown by $t_1$ of FIG. 8A, the processor can obtain a first image 851 in a state of locating a lens at a first location. At $t_2$, the processor can move the lens to a second location by as much as a predetermined distance by moving the lens in a direction towards an image sensor. Similar to FIG. 7A, the view angle of the second image obtained at the second location may be greater than the view angle of the first image 851.

The processor can select a part of the second image so that the view angle of the second image becomes practically identical to the view angle of the first image. Specifically, the processor can remove an area not included in the first image 851 from the second image. The processor can display the selected part 852 of the second image at $t_2$.

The processor can perform a DFD arithmetic operation by using a PSF based on a difference between the first image or the second image and the predetermined movement distance (e.g., $\delta_{lens}$), and it can determine a focus location according to the result.

With reference to FIG. 8A, the images displayed at $t_2$ are the second image having a view angle practically identical to the view angle of the first image, thus the view angles of images displayed at $t_1$ and $t_2$ may be practically identical. Accordingly, an inflection point where a view angle is decreasing after increasing (or increasing after decreasing) is removed, and a screen wobbling phenomenon recognized by a user may decrease.

Figure 9:
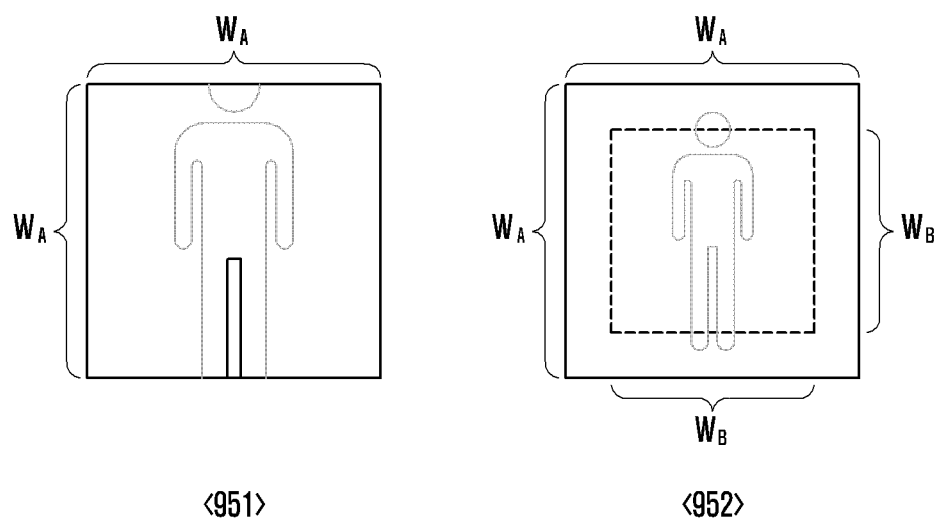
FIG. 9 illustrates a method of cropping an image, according to an embodiment.

FIG. 9 illustrates a method of cropping an image, according to an embodiment.

Referring to FIG. 9, the processor can obtain a cropped second image 952 having a first view angle by moving a lens to a second location and cropping a part of the second image 952 having a second view angle. The processor can crop the second image based on a predetermined movement distance, namely, a distance between the first location of the lens that obtained the first image and the second location of the lens that obtained the second image.

A method of calculating an area to be cropped from the second image 952 may use the following Formula (1).

$$W_B = (1 + \alpha \gamma_{lens}) W_A$$

$$H_B = (1 + \alpha \delta_{lens}) H_A \qquad \text{Formula (1):}$$

In Formula (1), $W_A$ indicates a horizontal length of the first image 951, $W_B$ indicates a horizontal length of the second image 952, $H_A$ indicates a vertical length of the first image 951, $H_B$ indicates a vertical length of the second image 952, $\delta_{lens}$ indicates the predetermined movement distance, and $\alpha$ indicates a coefficient for a unit lens movement distance.

The processor can determine an area to be cropped from the second image 952 by using Formula (1) and display a part of the second image 952 by cropping the second image 952. The processor can display the cropped second image in a display by expanding or reducing a partial resolution of the cropped second image according to a resolution of the display.

Figure 10:
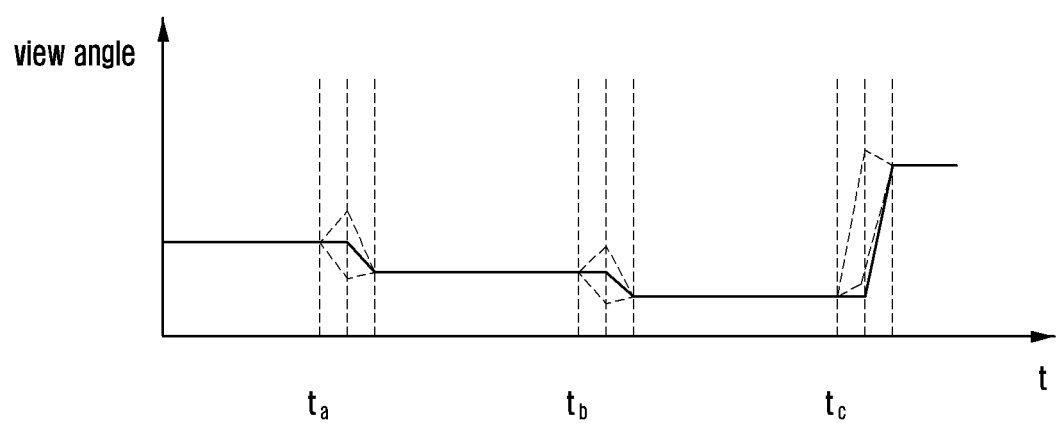
FIG. 10 illustrates a view angle change of an image displayed when controlling an AF function in a video capturing process, according to an embodiment.

FIG. 10 illustrates a view angle change of an image displayed when controlling an AF function in a video capturing process, according to an embodiment.

When displaying a preview screen continuously or a video by using a camera module 310, the focus location of the camera module may change if a position of an external object from an electronic device changes.

Referring to FIG. 10, the processor can detect a change of the external object at $t_b$. In this case, the processor can obtain a third image at a third location identical to a focus location (e.g., a second location) by using the camera module before the change of the external object. Specifically, if the change of the external object is detected, the processor can obtain a newly defocused image in a state in which the lens location is not changed from the previous focus location.

The processor can locate the lens at a fourth location by moving the lens by as much as a predetermined movement distance $\delta_{lens}$ after obtaining the third image, and it can obtain a fourth image corresponding to the fourth location of the lens unit by using the camera module. In this case, the processor can also display a part of the fourth image by cropping the fourth image so that the view angle of the fourth image becomes practically identical to the view angle of the third image.

The processor can determine a changed focus location corresponding to a change of the external object based on a difference between the third image and the fourth image. The method of determining a focus location based on the third image and the fourth image may be identical to the method of determining a focus location based on the first image and the second image.

Further, if a change in the external object is detected at $t_c$, the processor can perform an AF adjustment by the same method as the method of cropping the fourth image at $t_b$ and determining a focus location.

The processor can store an image having the same view angle as the view angle of the displayed image when capturing and storing a video. For example, in the case of displaying a part of an image in order to match a view angle of the image in an AF adjustment procedure, the image having the same view angle can be stored in a memory.

Figure 11A:
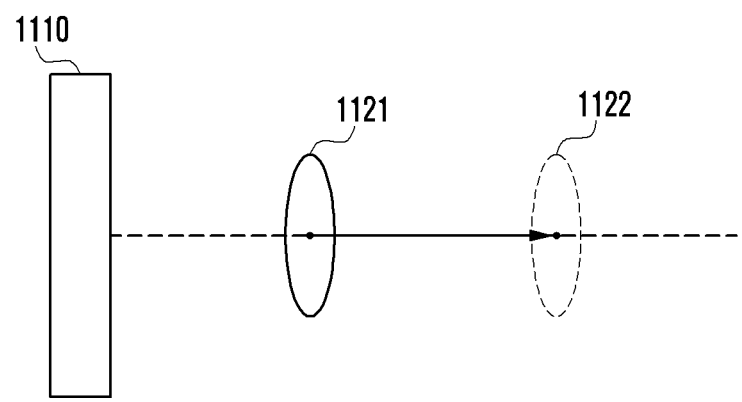
FIGS. 11A to 11C illustrate view angles of images displayed when controlling an AF function, according to an embodiment.
Figure 11B:
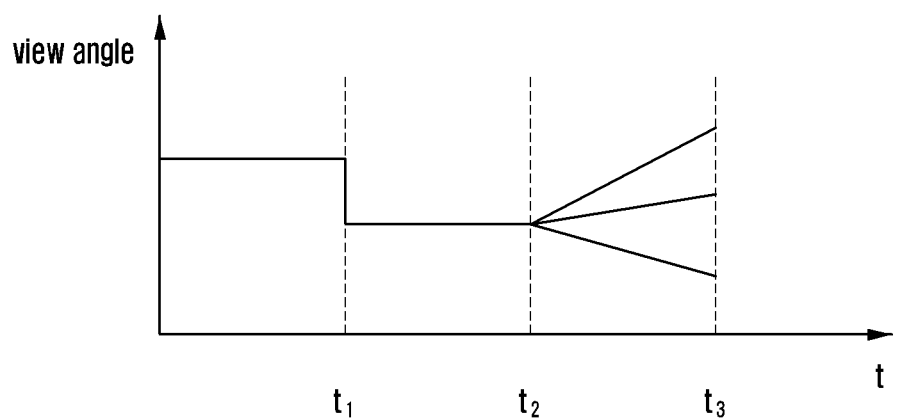
Figure 11C:
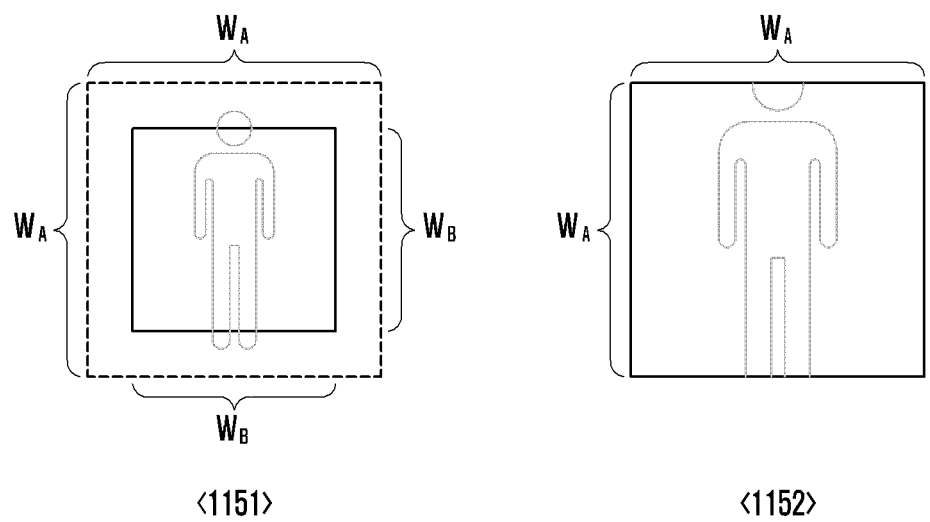

FIGS. 11A to 11C illustrate view angles of images displayed when controlling an AF, according to an embodiment.

When comparing FIGS. 11A to 11C with FIGS. 8A and 8B, FIGS. 11A to 11C are different in that at least one lens of a lens unit moves in a direction away from an image sensor 1110 in order to obtain a second image. In this case, a screen wobbling phenomenon arising in the AF adjustment procedure can be decreased.

Referring to FIGS. 11A-11B, at $t_1$, the processor can obtain a first image in a state in which the lens is located at a first location 1121. The processor can display the first image by cropping a part of the first image based on a predetermined movement distance. Specifically, the whole first image is not displayed at $t_1$ in the procedure of obtaining and displaying the first image, and the first image can be displayed by cropping according to a second view angle predicted through a predetermined movement distance.

At $t_2$, the processor can move the lens to a second location 1122 by moving the lens as much as the predetermined movement distance in a direction away from the image sensor. In this case, the view angle of the second image may be smaller than the view angle of the first image; however, the view angle of the image displayed at $t_1$ and the view angle of the image displayed at $t_2$ may be practically identical because the first image having the second view angle cropped at $t_1$ has been displayed.

At $t_3$, the processor can determine a focus location based on a difference between the first image and the second image and obtain a focused image by moving the lens to a focus location.

The electronic device 300 may include a display 320; a camera module 310 configured to move an image sensor, wherein the camera module includes a lens unit 311 including at least one lens disposed on the image sensor 313 and a lens driving unit 312 configured to move the at least one lens; and a processor 330 configured to display a first image including the external object obtained with a first view angle by using the camera module 310 through the display 320, move a location of the at least one lens by using the lens driving unit 312 so that a second view angle of the external object changes from the first view angle to a third view angle, obtain a second image including an external object with the third view angle by using the camera module 310, select a part of the second image so that a fourth view angle of the second image becomes practically identical to the first view angle, and display a part of the selected second image by using the display 320.

The processor 330 may be configured to obtain the second image by moving a location of the at least one lens by as much as a predetermined movement distance through the lens driving unit 312.

The processor 330 may be configured to select a part of the second image by cropping the second image based on the predetermined movement distance.

The processor 330 may be configured to determine a focus location of an image for the external object based on a difference between the first image or the second image and the predetermined movement distance.

The processor 330 may be configured to identify defocus amounts of the first image and the second image based on the first image, the second image, and the predetermined movement distance by using a point spread function, and determine the focus location based on the defocus amounts of the first image and the second image.

The processor 330 may be configured to obtain a third image according to the determined focus location and display the third image through the display 320.

The processor 330 may be configured to select a part of the second image based on Formula (1), reproduced below.

$$W_B = (1 + \alpha \gamma_{lens}) W_A$$

$$H_B = (1 + \alpha \delta_{lens}) H_A \qquad \text{Formula (1):}$$

Here, $W_A$ indicates a horizontal length of the first image, $W_B$ indicates a horizontal length of the second image, $H_A$ indicates a vertical length of the first image, $H_B$ indicates a vertical length of the second image, $\delta_{lens}$ indicates the predetermined movement distance, and $\alpha$ indicates a coefficient for a unit lens movement distance.

The processor 330 may be configured to control the camera module 310 to move the at least one lens in order to obtain the second image at least based on a change of the external object.

As at least one operation of selecting a part of the second image, the processor 330 may be configured to determine a resolution of at least one part of the selected second image based on a resolution of the display 320.

The electronic device 300 may include a camera module 310 including a lens unit 311 and a lens driving unit 312 configured to move the lens unit 311 in order to change a camera focus; a memory; and a processor configured to obtain a first image corresponding to a first location of the lens unit 311 by using the camera module 310, display the first image by using the display 320, move the lens unit 311 according to a predetermined movement distance by using the lens driving unit 312, obtain a second image corresponding to a second location of the lens unit 311 by using the camera module 310, display at least a part of the second image corresponding to the first image by using the display 320, determine a focus location of the lens unit 311 at least based on a difference between the first image and the second image, and move the lens unit 311 to the focus location by using the lens driving unit 312.

A first view angle of the first image may be smaller than a second view angle of the second image.

The processor 330 may be configured to select a part of the second image having a third view angle that is practically identical to the first view angle based on the second image.

The processor 330 may be configured to detect a change of an external object, obtain a third image corresponding to a third location that is identical to the focus location of the lens unit 311 by using the camera module 310, obtain a fourth image corresponding to a fourth location of the lens unit 311 by using the camera module 310, and determine a focus location corresponding to the change of the external object in the lens unit 311 at least based on a difference between the third image and the fourth image.

The processor 330 may be configured to move the lens unit 311 from the third location to the fourth location by the predetermined movement distance or less by using the lens driving unit 312.

A first view angle of the first image may be greater than a second view angle of the second image.

As at least one operation of displaying the first image by using the display 320, the processor 330 may be configured to select at least one part of the first image based on the predetermined movement distance and display the at least one part of the first image on the display 320.

FIG. 12 is a flowchart illustrating a method of controlling a camera AF function in an electronic device, according to an embodiment. The illustrated method can be performed by the electronic device described in FIGS. 1-11.

At step 1210, a processor displays a first image including an external object obtained with a first view angle by using a camera module through a display. The first image may be a defocused image.

At step 1220, the processor moves a location of at least one lens by using a lens driving unit so that a view angle of an external object changes from a first view angle to a second view angle. For example, the processor can move the location of at least one lens in a direction adjacent to an image sensor and, in this case, the second view angle may be greater than the first view angle. The processor can move the location of at least one lens by as much as a predetermined distance.

At step 1230, the processor obtains a second image including the external object with the second view angle by using the camera module which moved the location of at least one lens. The second image may be a defocused image, and the second view angle of the second image may be greater than the first view angle.

At step 1240, the processor selects a part of the second image so that the view angle of the second image becomes practically identical to the first view angle.

At step 1250, the processor displays the selected part of the second image through a display. For example, the processor can practically maintain the same view angle of the image displayed in an AF process by selecting a part of the second image (not all of the second image), even though the view angle of the image obtained from the image sensor changes according to the movement of the lens location.

Figure 13:
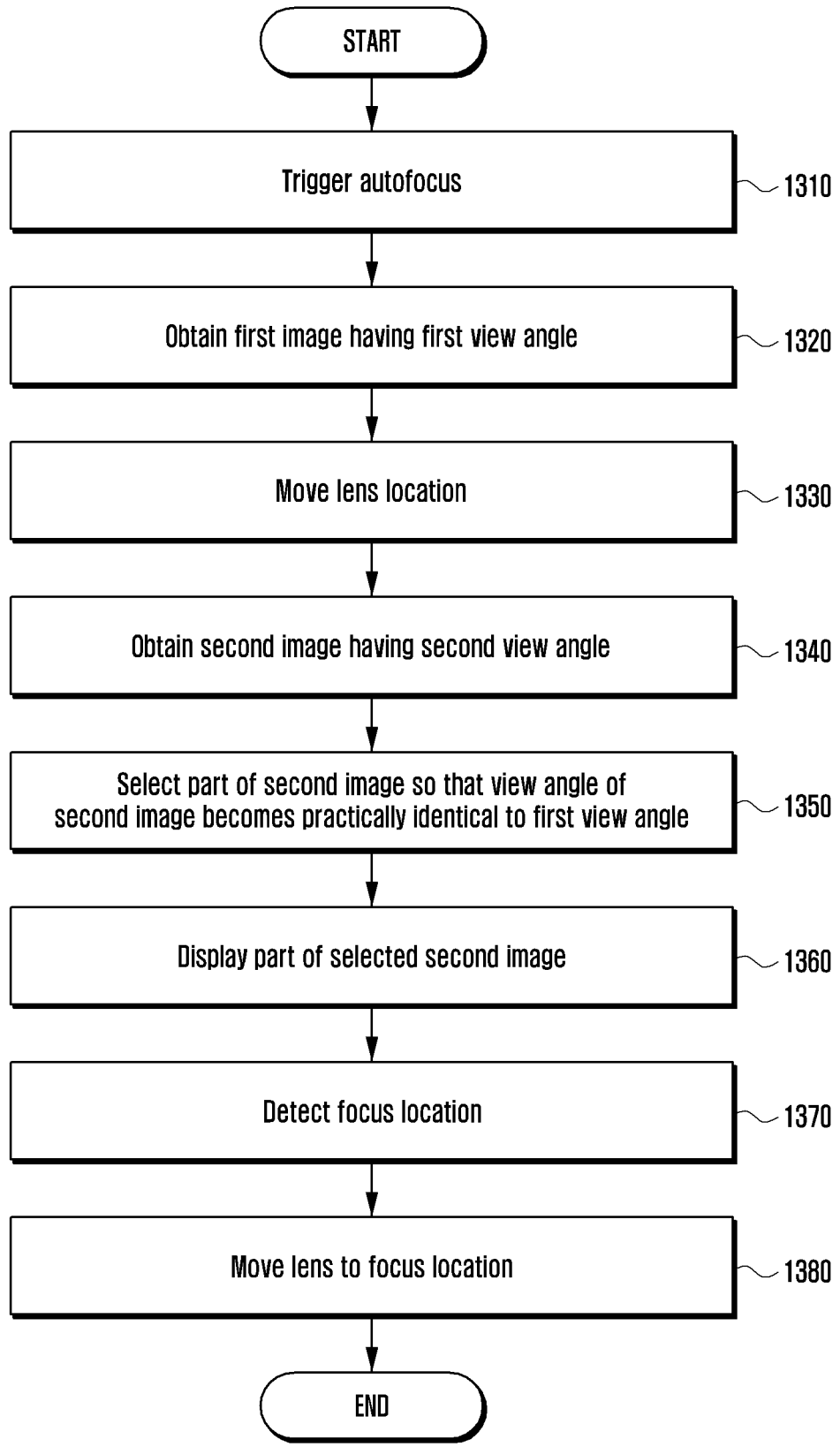
FIG. 13 is a flowchart illustrating a method of controlling a camera autofocus function in an electronic device, according to an embodiment.

FIG. 13 is a flowchart illustrating a method of controlling a camera AF function in an electronic device, according to an embodiment. The illustrated method can be performed by the electronic device described in FIGS. 1-11.

At step 1310, the processor identifies a trigger of an AF control. For example, the AF control can be triggered when the camera module 310 is turned on initially to obtain an image, or when a movement of an external object (or subject) is detected in an image capturing process (e.g., video).

At step 1320, the processor obtains a first image including an external object with a first view angle by using a camera module and displays the first image in a display. The first image may be a defocused image which is not in focus.

At step 1330, the processor moves a location of at least one lens to a second location by using a lens driving unit 312. The processor can move the location of at least one lens in a direction adjacent to the image sensor. Additionally, as shown in FIGS. 11A-11B, the processor can move the location of at least one lens in a direction displaced from the image sensor.

At step 1340, the processor obtains a second image with a second view angle in a state in which the at least one lens is located at the second location. The second image may be a defocused image, and the second view angle of the second image may be greater than the first view angle of the first image.

At step 1350, the processor selects a part of the second image so that the view angle of the second image becomes practically identical to the first view angle. The method for selecting a part of the second image is described in FIG. 9.

At step 1360, the processor displays the selected part of the second image through the display.

At step 1370, the processor determines a focus location for the image of the external object based on a difference between the first image or the second image and a predetermined movement distance. The processor can perform a DFD calculation by using a PSF, and determine the focus location through the DFD calculation. The method for determining the focus location by using the DFD calculation is described in FIG. 3 and FIG. 6.

At step 1380, the processor moves the at least one lens to the determined focus location and obtains a focused image.

Figure 14:
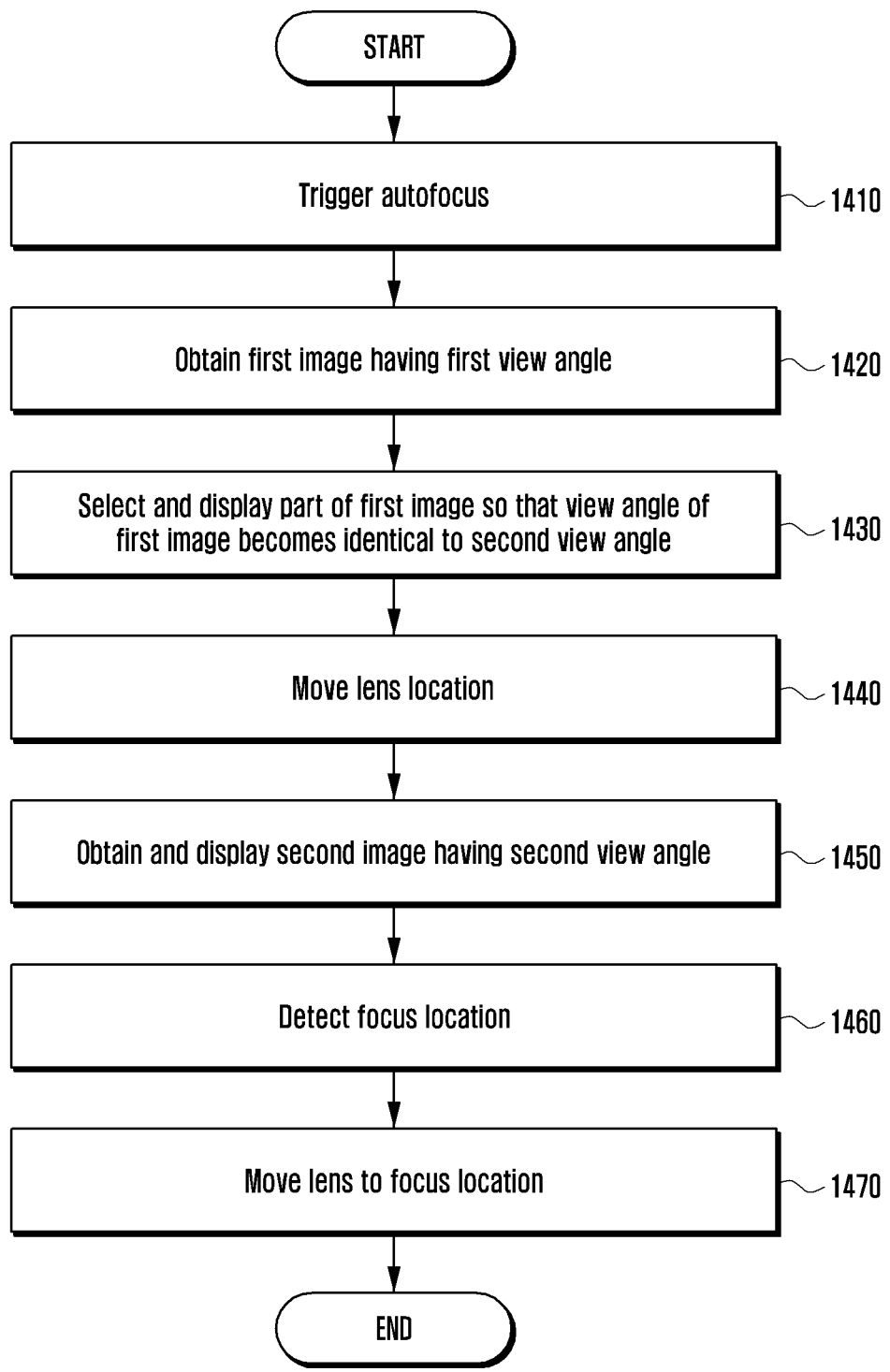
FIG. 14 is a flowchart illustrating a method of controlling a camera AF function in an electronic device, according to an embodiment.

FIG. 14 is a flowchart illustrating a method of controlling a camera AF function in an electronic device, according to an embodiment. The illustrated method can be performed by the electronic device described in FIGS. 1-11.

At step 1410, the processor identifies a trigger of an AF control.

At step 1420, the processor obtains a first image with a first view angle by using a camera module.

At step 1430, the processor selects a part of the first image so that a view angle of the first image becomes smaller than the first view angle of the first image. For example, the processor can crop a part of the first image received from the image sensor or read out only the partial area of the first image selected from the image sensor. The processor can determine a second view angle corresponding to the first view angle based on a predetermined movement distance of a lens for obtaining the second image. The processor can display the selected part of the first image in the display.

At step 1440, the processor moves the location of at least one lens to a second location by using a lens driving unit. The processor can move the location of at least one lens in a direction displaced from the image sensor.

At step 1450, the processor obtains and displays a second image with a second view angle. The second image with the second view angle is displayed through the display in a state of locating the at least one lens at the second location.

At step 1460, the processor determines a focus location of an image for an external object based on a difference between the first image or the second image and a predetermined movement distance. The processor can perform a DFD arithmetic operation by using a PSF and determine the focus location through the DFD arithmetic operation. The method for determining the focus location by using the DFD arithmetic operation is described in FIG. 3 and FIG. 6.

At step 1470, the processor moves at least one lens to the predetermined focus location and obtains a focused image.

A method for controlling an AF function in an electronic device may include obtaining and displaying a first image comprising an external object obtained with a first view angle (i.e., step 1210), moving a location of at least one lens so that a second view angle of the external object changes from the first view angle to a third view angle (i.e., step 1220), obtaining a second image comprising an external object obtained with the third view angle in a state that the location of at least one lens moved (i.e., step 1230), selecting a part of the second image so that a fourth view angle of the second image becomes practically identical to the first view angle (i.e., step 1240), and displaying a part of the selected second image (i.e., step 1250).

Obtaining the second image may include moving the location of at least one lens a predetermined movement distance or less.

Selecting a part of the second image may include selecting a part of the second image by cropping the second image based on the predetermined movement distance.

Additionally, the method may further include determining a focus location of an image for the external object based on a difference between the first image or the second image and the predetermined movement distance.

Determining the focus location may include identifying defocus amounts of the first image and the second image based on the difference between the first image or the second image and the predetermined movement distance by using a point diffusion function (i.e., a PDF), and determining the focus location based on the defocus amounts of the first image and the second image.

Accordingly, an electronic device of the present disclosure may enable a screen wobbling phenomenon to be minimized in an AF control process and provide a method for controlling a camera AF function in the electronic device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:

a display;

a camera module configured to move an image sensor, wherein the camera module includes a lens unit comprising at least one lens disposed on the image sensor and a lens driving unit configured to move the at least one lens; and a processor configured to:

in response to triggering of depth from defocus (DFD) auto-focus function, display a first image comprising an external object obtained with a first view angle by using the camera module through the display, move a location of the at least one lens by using the lens driving unit so that the view angle of the external object changes from the first view angle to a second view angle, obtain, using the camera module, a second image comprising the external object with the second view angle by moving a location of the at least one lens with a predetermined movement distance through the lens driving unit, select a part of the second image by cropping the second image, wherein a view angle of the selected part of the second image corresponds to the first view angle, display the selected part of the second image by using the display, and determine a focus location of an image for the external object based on a difference between the first image and the second image, and the predetermined movement distance.

2. The electronic device of claim 1, wherein the processor is further configured to select the part of the second image by cropping the second image based on the predetermined movement distance.

3. The electronic device of claim 1, wherein the processor is further configured to identify defocus amounts of the first image and the second image based on the first image, the second image, and the predetermined movement distance by using a point spread function, and determine the focus location based on the defocus amounts of the first image and the second image.

4. The electronic device of claim 1, wherein the processor is further configured to obtain a third image according to the determined focus location and display the third image through the display.

5. The electronic device of claim 1, wherein the processor is further configured to control the camera module to move the at least one lens in order to obtain the second image at least based on a change of the external object.

6. The electronic device of claim 1, wherein the processor, as at least one operation of selecting a part of the second image, is further configured to determine a resolution of at least one part of the selected second image based on a resolution of the display.

7. An electronic device comprising:
a display;
a camera module comprising a lens unit and a lens driving unit configured to move the lens unit in order to change a camera focus;
a memory; and
a processor configured to:
in response to triggering of depth from defocus (DFD) auto-focus function, obtain a first image corresponding to a first location of the lens unit by using the camera module,
display the first image by using the display,
move the lens unit according to a predetermined movement distance by using the lens driving unit,
obtain a second image corresponding to a second location of the lens unit by using the camera module,
select a part of the second image by cropping the second image, wherein a view angle of the selected part of the second image corresponds to a view angle of the first image,
display the selected part of the second image by using the display,
determine a focus location of the lens unit at least based on a difference between the first image and the second image, and the predetermined movement distance, and
move the lens unit to the focus location by using the lens driving unit.

8. The electronic device of claim 7, wherein the view angle of the first image is smaller than a view angle of the second image.

9. The electronic device of claim 8, wherein the processor is further configured to:
detect a change of an external object,
obtain a third image corresponding to a third location that is identical to the focus location of the lens unit by using the camera module,
obtain a fourth image corresponding to a fourth location of the lens unit by using the camera module, and
determine a focus location corresponding to the change of the external object in the lens unit at least based on a difference between the third image and the fourth image.

10. The electronic device of claim 9, wherein the processor is further configured to move the lens unit from the third location to the fourth location by the predetermined movement distance or less by using the lens driving unit.

11. A method for controlling an autofocus function in an electronic device, the method comprising:
in response to triggering of depth from defocus (DFD) auto-focus function, obtaining and displaying a first image comprising an external object obtained with a first view angle;
moving a location of at least one lens with a predetermined movement distance, so that a view angle of the external object changes from the first view angle to a second view angle;
obtaining a second image comprising the external object obtained with the second view angle in a state that the location of at least one lens is moved;
selecting a part of the second image by cropping the second image, wherein the view angle of the selected part of the second image corresponds to the first view angle;
displaying the selected part of the second image, and
determining a focus location of an image for the external object based on a difference between the first image and the second image, and the predetermined movement distance.

12. The method of claim 11, wherein selecting a part of the second image further comprises selecting the part of the second image by cropping the second image based on the predetermined movement distance.

13. The method of claim 11, wherein determining the focus location further comprises:
identifying defocus amounts of the first image and the second image based on the difference between the first image or the second image and the predetermined movement distance by using a point diffusion function; and
determining the focus location based on the defocus amounts of the first image and the second image.

* * * * *